United States Patent [19]

Mussinan et al.

[11] 3,885,051

[45] May 20, 1975

[54] FLAVORING AND AROMATISING WITH 3-ACETYL-2,5-DIALKYL FURANS OR THIOPHENES

[75] Inventors: Cynthia J. Mussinan, Brick Town; Manfred Vock, West Orange, both of N.J.; Edward Joseph Shuster, Brooklyn; Alton Dewitt Quinn, Calicoon, both of N.Y.

[73] Assignee: International Flavors & Fragrances Inc., New York, N.Y.

[22] Filed: Oct. 30, 1972

[21] Appl. No.: 301,865

[52] U.S. Cl. ................................................. 426/535
[51] Int. Cl. ................................................. A23l 1/26
[58] Field of Search .................. 260/347.8, 332.3 C; 426/65, 175, 221, 222

[56] References Cited
UNITED STATES PATENTS 3,702,253  11/1972  Winter et al. .......................... 426/175

Primary Examiner—Joseph M. Golian
Attorney, Agent, or Firm—Brooks Haidt & Haffner

[57] ABSTRACT

A 3-acetyl-2,5-dialkyl furan or thiophene having the formula

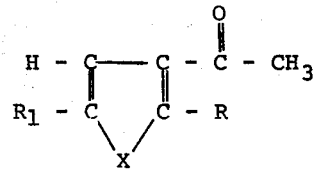

wherein X is sulfur or oxygen and R and $R_1$ is lower alkyl of 1 to 5 carbon atoms is used to alter the flavor or aroma of a consumable material such as a foodstuff, tobacco, or perfume.

3 Claims, No Drawings

FLAVORING AND AROMATISING WITH 3-ACETYL-2,5-DIALKYL FURANS OR THIOPHENES

BACKGROUND OF THE INVENTION:

The present invention relates to altering the organoleptic properties of a consumable material. More particularly, this invention is concerned with the use of a 3-acetyl-2,5-dialkyl-furan or thiophene to alter the flavor and/or aroma characteristics of a consumable material such as a foodstuff, tobacco or perfume.

The term "alter" in its various forms is used herein to mean the supplying or imparting of a flavor or aroma characteristic or note to an otherwise bland, relatively tasteless or non-odorous substance, or augmenting an existing flavor or aroma characteristic where the natural flavor or intrinsic odor is deficient in some regard, or supplementing the existing flavor or aroma impression to modify its quality, character, taste or aroma.

The term "consumable material" as used herein includes various products that are utilized by natural persons and includes foodstuffs, tobacco products, and perfumes.

The term "foodstuff" as used herein includes both solid and liquid ingestible materials which usually do, but need not have nutritional value. Thus, foodstuffs include meats, gravies, soups, convenience foods, beverages, dairy products, candies, vegetables, cereals, soft drinks, snacks and the like.

The term "perfume" as used herein means a mixture of compounds, including for example, natural oils, synthetic oils, alcohols, aldehydes, ketones, esters, lactones, and frequently hydrocarbons which are admixed so that the combined odors of the individual components produce a pleasant or desired fragrance.

The term "tobacco" as used herein means natural products such as, for example, burley, Turkish tobacco, Maryland tobacco, flue-cured tobacco including tobacco-based or tobacco-like products such as reconstituted or homogenized leaf, as well as tobacco substitutes intended to replace natural tobacco, such as lettuce and cabbage leaves, and other materials designed or adapted to be used for smoking, chewing or snuff purposes.

PRIOR ART

Various 2-acetyl furans and 2-acetyl thiophenes have been suggested for use in coffee flavors. British Patent 1,156,481 shows 2-acetyl furan and 2-acetyl-5-methyl furan as flavoring agents for coffee. British Patent 1,156,481 discloses 2-acetyl thiophene and various monoalkyl-2-acetyl thiophenes as flavoring agents for cofee. Schultz, Day and Libbey, *The Chemistry and Physiology of Flavors*, The AVI Publishing Company Inc., (1967), pages 442 and 443 disclose that 2-acetyl furan, 2-acetyl thiophene and 5-methyl-2-acetyl furan are among the volatile constituents of coffee. Arctander, *Perfume and Flavor Chemicals*, Vol. I, Item 39, Montclair, N.J. (1969) states that 2-acetyl furan could find use in floral fragrances. And, Dutch Published Application 68.12899 shows that 2-acetyl-3-methyl furan and 2-propionyl-3-methyl furan give a roast bean note to coffee.

SUMMARY OF THE INVENTION

In accordance with this invention, it has been found that certain 3-acetyl-2,5-dialkyl furans and thiophenes are used to alter the flavor or aroma of a consumable material.

The 3-acetyl-2,5-dialkyl furans and thiophenes found suitable according to this invention may be represented by the formula

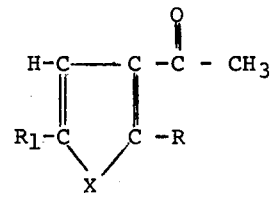

wherein X is oxygen or sulfur and R and $R_1$ are alkyl containing from 1 to 5 carbon atoms. Preferably, R and $R_1$ are the same and represent lower alkyl such as methyl, ethyl or propyl. Especially suitable are compounds in which R and $R_1$ is methyl.

DESCRIPTION OF THE PREFERRED EMBODIMENTS

The 3-acetyl-2,5-dialkyl furans of this invention are known compounds. For example, 3-acetyl furans and their method of preparation is disclosed in Hurd and Wilkinson, *J. A. Chem. Soc.* 70, 739–741 (1948) and the 3-acetyl thiophenes may be similarly prepared from the corresponding thiophene materials. However, no one had previously recognized the utility of these compounds as flavoring or aromatising agents.

It has been found that the 3-acetyl-2,5-dialkyl furans and thiophenes of this invention are useful in nut flavors, especially hazelnut and walnut, vanilla and milk chocolate flavors, caramel and coffee flavors. They also add desired nuances to gravy and meat flavors. They may be used in almond, marzipan, cherry, and baked goods, and fruit flavors such as grape. In tobacco products they add pungent narcotic-like notes and in perfumes they impart a sweet nutty hawthorne-like note.

The 3-acetyl-2,5-dialkyl furans and thiophenes which have been found especially suitable are:

3-Acetyl-2,5-dimethyl furan having the structure

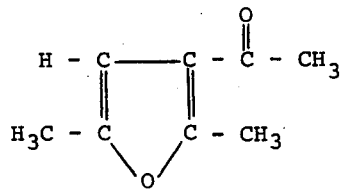

This compound, a clear yellow liquid, has a nutty sweet taste with the mustiness of concord grapes at concentrations of about 0.1 ppm. At lower concentrations (0.02 ppm) it has a sweet vanilla, milk chocolate aroma. Its taste threshold level is 0.1 parts per million (ppm).

3-Acetyl-2,5-dimethyl thiophene having the formula

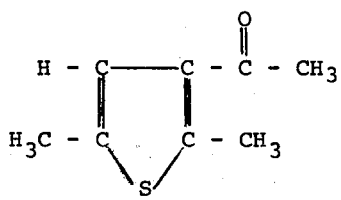

has a sweet dried hazelnut taste with sweet almond-/marzipan notes at 0.2 and 0.5 parts per million. Its taste threshold level is 0.05 parts per million.

The 3-acetyl-2,5-dialkyl furans and thiophenes contemplated here may be employed either singly or in admixtures comprising two or more thereof. Admixtures of the 3-acetyl-2,5-dialkyl furans and with other flavoring or aromatising materials offers the advantages of combining the beneficial and organoleptic qualities of each of the compounds into a total impact which is superior to or different from the characteristics of the sole ingredient. For example, salt enhances the meat gravy character of the 3-acetyl-2,5-dialkyl furans and thiophenes and sugar enhances the sweet dried hazelnut, coffee caramel notes. The formulator can simulate a wide variety of organoleptic characteristics to evoke a predetermined taste response on the part of the consumer.

Generally in use the 3-acetyl-2,5-dialkyl furans or thiophenes are admixed with one or more auxiliary flavoring or perfume adjuvants. The precise adjuvants employed will depend upon the ultimate use contemplated and the organoleptic character desired. Flavoring adjuvants are recognized in the art and are ingestibly acceptable or non-toxic. Such flavoring adjuvants include stabilizers, thickeners, surface active agents, conditioners, flavorants and flavor intensifiers.

Stabilizers include preservatives, e.g., sodium chloride, antioxidants, e.g., calcium sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickeners include carriers, binders, protective colloids, suspending agents, emulsifiers and the like, e.g., agar-agar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches; pectins, and emulsifiers, e.g. mono- and di-glycerides of fatty acids.

Surface active agents include emulsifying agents, e.g. fatty acids such as capric acid, caprylic acid, palmitic acid, myristic acid and the like, mono- and di-glycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g. benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g. sodium acetate, ammonium bicarbonate, ammonium phosphate, citric acid, lactic acid, vinegar and the like; colorants, e.g., carminic acid, cochineal, tumeric and curcunin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamins, zinc sources such as zinc chloride, zinc sulfate and the like.

Flavorants and flavor intensifiers include organic acids, e.g., fatty saturated, unsaturated and amino acids; alcohols, e.g. primary and secondary alcohols; esters, carbonyl compounds including aldehydes and ketones, lactones; cyclic organic materials including benzene derivatives; alicyclics, heterocyclics such as furans, particularly 2-acetylfuran, pyridines, pyrazines and the like, sulfur-containing materials including thiazoles, thiols, sulfides, disulfides and the like; so-called flavor potentiators such as monosidum glutamate, guanylates, inosinates, natural and synthetic flavorants such as vanillin, natural gums and the like; spices, herbs, essential oils and extractives including anise, anise oil, alkanet root extract, bay leaves, capsicum extract and the like.

The specific flavoring adjuvant selected for use may be either solid or liquid, depending upon the desired physical form of the ultimate product, i.e., foodstuff, whether simulated or natural, and should, in any event, be capable of providing an environment in which the 3-acetyl-2,5-dialkyl furan or thiophene can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contra-distinction, in the preparation of solid products, e.g., simulated foodstuffs, ingredients capable of providing normally solid compositions should be selected such as various cellulose derivatives.

The flavoring ingredients can be added to the consumable material to be flavored at any convenient point in the production of the finished product. They can be added in the original mixture, dough, emulsion batter or at any time in the cooking operation. Alternatively, they can be added at a later stage of processing if volatilization losses would be excessive during earlier processing.

Among the preferred flavoring or aromatising adjuvants are vanillin, benzaldehyde, methyl furoate, diacetyl, maltol, methyl cyclopentenolone, pyruvic acid, isoamyl levulinate, ethyl anthranilate, ethyl acetate, orange oil, dimethyl anthranilate, ethyl heptanoate, acetoin, butyl butyryl lactate, ethyl vanillin, ethyl butyrate, rose oil, benzyl acetate, tolyl aldehyde, alpha ionone, para-tolylacetaldehyde, and heliotropin.

Auxiliary perfume adjuvants include carriers, vehicles, solvents, dispersants, emulsifiers, surface-active agents, aerosol propellants, and the like. In perfume compositions, the individual components contribute their particular olfactory characteristics, but the overall effect of the perfume composition will usually at least be the sum of the effect of each ingredient. Thus, the 3-acetyl-2,5-dialkyl furan or thiophene of this invention can be used to alter the aroma characteristics of a perfume composition, for example, by highlighting or moderating the olfactory reaction contributed by another ingredient of the composition.

The amount of the 3-acetyl-2,5-dialkyl furan or thiophene employed in a particular instance can vary over a relatively wide range to achieve the desired organoleptic effects and in accordance with the ultimate consumer use. Thus, correspondingly greater amounts would be necessary in those instances wherein the ultimate consumable product to be flavored or aromatised is relatively bland to the senses; whereas, relatively lesser quantities may suffice for purposes of enhancing a composition merely deficient in a natural flavor or aroma. The primary requirement is that the amount selected be effective, i.e., sufficient to alter the organoleptic characteristics of the material to which it is added or incorporated. The quantity used will depend on the ultimate consumable product, the particular 3-acetyl-2,5-dialkyl furan or 3-acetyl-2,5-dialkyl thiophene used, the amount and type of flavor or aroma initially present in the product, required and other preference factors, storage conditions, and the preconsumption or processing conditions to which the product or composition will be subject.

Effective quantities of the 3-acetyl-2,5-dialkyl furan or thiophene of this invention range from 0.5 parts per billion to about 15 parts per million based on the total weight of the foodstuff to which it is added. While larger concentrations can be used they are less economic since additional amounts do not necessarily give equivalent incremental flavor enhancement. In those instances wherein the 3-acetyl-2,5-dialkyl furan or thiophene of this invention is added to the foodstuff as an essential and integral part of a flavoring composition, it is, of course, necessary that the total quantity of flavoring composition employed be sufficient to yield an effective concentration.

Flavoring compositions prepared in accordance with the present invention preferably contain the 3-acetyl-2,5-dialkyl furan or thiophene in concentrations ranging from $5 \times 10^{-8}$ to about 10% by weight, based on the total weight of said flavoring compositions, but may contain as much as 80 or 90% by weight of the 3-acetyl-2,5-dialkyl furans or thiophenes if the flavoring composition is then applied in very small amount.

The 3-acetyl-2,5-dialkyl furans or thiopenes of this invention can also be added to perfume compositions in their pure form or they can be added to mixtures of materials in fragrance-imparting compositions to provide a desired fragrance character to a finished perfume material. The perfume and fragrance compositions obtained according to this invention are suitable in a wide variety of perfume articles and can also be used to improve, enhance, modify, alter or reinforce fragrance materials. It will thus be appreciated that the 3-acetyl-2,5-dialkyl furans or thiophenes and mixtures thereof of this invention are useful as olfactory agents and fragrances, and are suitable for imparting sweet hawthorne-like notes.

The amount of one or more compounds of this invention which will be effective in perfume compositions depends on many factors, including the other ingredients, cost, their amounts and the fragrance and other effects desired.

When used as a perfume ingredient, the 3-acetyl-2,5-dialkyl furans and thiophenes will represent from about 0.001% to about 10% of the total weight of the perfume oils present in the composition. Even lesser quantities may be used to intensify or augment and enhance various types of fragrance compounds, the odors of which may be desired to be imparted to colognes, perfumes, bath oils, powders, and the other cosmetic products.

When the materials are used to alter the flavor or aroma of tobacco, they can be applied in any suitable manner, as by spraying, dipping or otherwise. The 3-acetyl-2,5-dialkyl furans or thiophenes can be applied during the "casing" or final spray treatment of the tobacco, or they can be applied at some earlier spray treatment of the tobacco, or at some earlier stage of curing or preparation.

In tobacco applications, the amount of 3-acetyl-2,5-dialkyl furan or thiophene can be present in as little as 0.002% (20 ppm) and as much as 0.02% (200 ppm) based on the total weight of the tobacco composition and depending upon whether a cigarette tobacco, pipe tobacco, cigar tobacco, chewing tobacco, or snuff is being prepared.

All parts, proportions, percentages and ratios herein are by weight unless otherwise indicated.

The following examples are given to illustrate embodiments of the invention as it is now preferred to practice it. It will be understood that these examples are illustrative, and the invention is not to be considered as restricted thereto except as indicated in the appended claims.

EXAMPLE I

Preparation of 3-Acetyl-2,5-Dimethyl Furan

The following materials in the amounts indicated are placed in a 250 cc three-neck reaction flask equipped with mechanical stirrer, thermometer, heating mantle, drying tube, and condenser:

| Ingredients | Amount |
| --- | --- |
| 2,5-dimethyl furan | 92 grams |
| acetic anhydride | 128 grams |
| stannic chloride | 0.4 ml |

The reaction mass is stirred at reflux for a period of 4 hours. The temperature of the reaction mass does not exceed 110°C. The resulting reaction mass is distilled at 73°C and 30 mm Hg pressure. Infrared, mass spectral, and NMR analyses confirms that the product is 3-acetyl-2,5-dimethyl furan. The purity as shown by gas liquid chromatography is 99%. The yield is 26.4 grams or 20%; refractive index 1.4884 at 20°C. This product is a clear yellow liquid having a nutty sweet dry hazelnut taste at 0.1 ppm in aqueous solution.

EXAMPLE II

Preparation of 3-Acetyl-2,5-Dimethyl Thiophene

The following ingredients in the amounts indicated are placed in a 250 cc three-neck reaction flask equipped with mechanical stirrer, thermometer, heating mantle, condenser, and calcium chloride drying tube:

| Ingredient | Amount |
| --- | --- |
| 2,5-dimethyl thiophene | 30 grams |
| acetic anhydride | 34 grams |
| stannic chloride | 0.15 grams |

The reaction mass is refluxed for a period of 4 hours, the pot temperature not exceeding 135°C. The mixture is then transferred to a distillation apparatus and vacuum distilled. The product distills at 75°C and 9 mm Hg pressure.

IR, mass spectral and NMR analyses confirm that this material is 3-acetyl-2,5-dimethyl thiophene. The purity is 96.8%, and the yield is 4.13 grams or 10%. This material has a sweet dried hazelnut taste with sweet almond-marzipan notes at 0.2 ppm and 0.5 ppm in aqueous solution.

EXAMPLE III

The following formulation is prepared:

| Ingredients | Parts by Weight |
| --- | --- |
| 3-acetyl-2,5-dimethyl furan prepared by the process of Example I | 20.0 |
| Mixture of C.20–C.75 polyisoprenoid hydrocarbons and alcohols produced by the process of Example II of U.S. Patent 3,589,372 | 102.0 |
| geraniol coeur | 1.5 |
| isovaleric acid | 2.0 |
| phenylacetic acid | 2.0 |
| 95% aqueous ethyl alcohol | 472.5 |
| propylene glycol | 400.0 |

This mixture is added to Burley tobacco at concentration of 0.125% based on the weight of the tobacco and imparts to the tobacco a coumarin nutty-like and cocoa-like note.

EXAMPLE IV

A 1% ethyl alcohol solution of a 50-50 mixture of 3-acetyl-2,5-dimethyl-furan and 3-acetyl-2,5-dimethyl thiophene is added to an aged flue cured and shredded tobacco by means of spraying, in an amount to provide a tobacco containing 0.001% by weight of the mixture of additives on a dry basis. Thereafter the alcohol is removed by evaporation and the tobacco is manufactured into cigarettes by the usual techniques. The cigarettes have an enhanced natural coumarin, nutty-like taste character and aroma both before and during smoking.

EXAMPLE V

The following mixture is prepared:

| Ingredients | Parts by Weight |
| --- | --- |
| 3-acetyl-2,5-dimethyl thiophene prepared by the process of Example II | 20.0 |
| gamma-heptalactone | 50.0 |
| heliotropine | 300.0 |
| benzaldehyde | 50.0 |
| benzyl cinnamate | 100.0 |
| dimethyl resorcinol | 2.0 |
| anisaldehyde | 30.0 |
| gamma-undecalactone | 5.0 |
| 95% aqueous ethanol | 443.0 |

This mixture is added to tobacco at a concentration of 0.125% based on the weight of the tobacco and imparts to the tobacco a desired heavy note of natural coumarin as well as cocoa and nutty notes. The 3-acetyl-2,5-dimethyl thiophene acts as an enhancer for the remainder of the formulation which is a standard natural coumarin substitute.

EXAMPLE VI

A walnut flavor formulation is prepared by blending the following ingredients:

| Ingredients | Parts by Weight |
| --- | --- |
| vanillin | 4.0 |
| ethyl-2-methyl butyrate | 1.0 |
| butyl isovalerate | 4.0 |
| 2,3-diethyl pyrazine | 0.5 |
| methyl cyclopentenolone α-hydroxy-β-methyl-Δ $\alpha,\beta$ -γ-hexenolactone | 8.0 2.0 |
| benzaldehyde | 6.0 |
| valerian oil Indonesia (0.1% solution in propylene glycol) | 0.5 |
| propylene glycol | 74.0 |

This walnut flavor is compared in water at the rate of 10 ppm with the identical flavor to which 0.5 parts of 3-acetyl-2,5-dimethyl thiophene is added. The flavor containing 3-acetyl-2,5-dimethyl thiophene has a fuller, more natural walnut kernel like taste because of the addition to the formulation of said thiophene compound.

EXAMPLE VII

A vanilla flavor formulation is prepared by blending the following ingredients:

| Ingredients | Parts by Weight |
| --- | --- |
| maltol | 2.0 |
| ethyl vanillin | 5.0 |
| vanillin | 18.0 |
| 1,2 benzodihydropyrone 10% (ethanol 95%) | 1.0 |
| anisaldehyde (1% solution in ethanol 95%) | 0.5 |
| balsam Peru (1% solution in ethanol 95%) | 1.5 |
| ethyl alcohol | 72.0 |

This vanilla flavor is compared with the same flavor to which 0.01% 3-acetyl-2,5-dimethyl thiophene is added. The flavors are compared at the rate of 0.02% or 200 ppm in water. The sample containing 3-acetyl-2,5-dimethyl thiophene has more of the natural sweetness as reproduced by natural vanilla extract, and also has a fuller taste and better mouthfeel.

EXAMPLE VIII

A walnut flavor is prepared by blending the following ingredients:

| Ingredients | Parts by Weight |
| --- | --- |
| vanillin | 4.0 |
| ethyl-2-methylbutyrate | 1.0 |
| butyl/isovalerate | 4.0 |
| 2,3-diethyl pyrazine | 0.5 |
| methyl cyclopentenolone | 8.0 |
| α-hydroxy-β-methyl-Δ $\alpha,\beta$ -γ-hexenolactone | 2.0 |
| benzaldehyde | 6.0 |
| valerian oil Indonesian (0.1% solution in propylene glycol) | 0.5 |
| propylene glycol | 74.0 |

This walnut flavor is compared in water at the rate of 10 ppm with the same flavor to which 2% 3-acetyl-2,5-dimethyl furan is added. The flavor containing the 3-acetyl-2,5-dimethyl furan has a sweeter, more walnut kernel and rounded taste and is therefore improved.

EXAMPLE IX

The following mixture is prepared:

| Ingredients | Parts by Weight |
| --- | --- |
| patchouli oil | 50.0 |
| cassia oil | 100.0 |
| lavender oil | 100.0 |
| bergamot oil | 100.0 |
| tolu resin | 40.0 |
| citronellol coeur | 150.0 |
| nenol coeur | 50.0 |
| jasmin absolute | 50.0 |
| citronella oil Ceylon | 50.0 |
| phenyl ethyl alcohol | 35.0 |
| 3-acetyl-2,5-dimethyl furan | 36.2 |

The 3-acetyl-2,5-dimethyl furan gives added quality and bloom to this otherwise routine spicy perfume formulation which is suitable for use in after-shave lotions.

EXAMPLE X

The following mixture is prepared:

| Ingredients | Parts by Weight |
| --- | --- |
| phenyl acetaldehyde | 100.0 |
| benzophenone | 50.0 |
| terpineol | 250.0 |
| bergamot oil | 200.0 |
| violet phenyl acetate | 30.0 |
| violet leaves absolute | 20.0 |
| heliotropine | 200.0 |
| musk ambrette | 25.0 |
| rose absolute | 75.0 |
| 3-acetyl-2,5-dimethyl thiophene | 1.2 |

The 3-acetyl-2,5-dimethyl thiophene gives added quality and bloom to this otherwise routine sweet pea formulation.

EXAMPLE XI

The following mixture is prepared:

Formulation A

| Ingredients | Parts by Weight |
| --- | --- |
| ethyl maltol | 1 |
| maltol | 2 |
| vanillin | 4 |
| methyl cyclopentenolone | 5 |
| benzaldehyde | 1 |
| resorcin dimethyl ether 0.1% (in 95% ethyl alcohol) | 1 |
| absolute Fenugreek 1% (in 95% ethyl alcohol) | 5 |
| ethyl oleate | 1 |
| gamma-nonalactone 1% (in 95% ethyl alcohol) | 5 |
| trimethyl pyrazine 0.1% (in 95% ethyl alcohol) | 2 |
| 2-ethyl-5-methyl pyrazine 0.1% (in 95% ethyl alcohol) | 1 |
| alcohol 95% | 12 |
| propylene glycol | 60 |

To said Formulation A, 2 parts by weight of 2-acetyl furan is added. The resulting mixture is compared by a bench panel of four people with the same mixture without the 2-acetyl furan at the concentration of 300 ppm in water. It is determined that 2-acetyl furan adds a weak cereal-like note but does not contribute to the hazelnut character.

To Formulation A, 0.1 part of 3-acetyl-2,5-dimethyl furan is added and the resulting mixture is compared with the mixture containing 2-acetyl furan by the four-member bench panel at the concentration of 300 ppm in water. The conclusion of the bench panel is that the 3-acetyl-2,5-dimethyl furan contributes to a good sweet dried or light roasted hazelnut taste. This is completely lacking when the 2-acetyl furan is added.

To Formulation A, two parts by weight of 2-acetyl thiophene is added and the resulting mixture is compared by the four-member bench panel with a mixture that does not contain the 2-acetyl thiophene. The bench panel concludes that a meaty roasted taste is imparted to the formulation by the 2-acetyl thiophene and this meaty roasted taste is offensive to the desired hazelnut character. The final conclusion is that 2-acetyl thiophene is unsuitable in hazelnut flavor formulations.

To Formulation A, 0.1% by weight of 3-acetyl-2,5-dimethyl thiophene is added and the resulting mixture is compared by the four-bench panel with the same formulation containing 2-acetyl thiophene instead of the 3-acetyl-2,5-dimethyl thiophene at the rate of 300 ppm in water. The panel concludes that 3-acetyl-2,5-dimethyl thiophene adds a sweet dried or light roasted hazelnut note similar to the taste effect achieved by using 3-acetyl-2,5-dimethyl furan. The final conclusion is that 3-acetyl-2,5thiophene is an important hazelnut flavor chemical; unlike the 2-acetyl thiophene which contributes no hazelnut character at all.

What is claimed is:

1. A process for altering the hazelnut or walnut flavor of a foodstuff comprising the step of adding to a foodstuff a flavoring composition comprising from about 5 × 10⁻⁸ to about 90 percent by weight based on the total weight of the flavoring composition, of a compound having the formula:

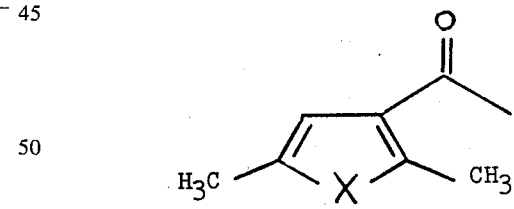

wherein X is selected from the group consisting of sulfur and oxygen.

2. The process of claim 1 wherein in the substituted furan X is sulfur.

3. The process of claim 1 wherein in the substituted furan X is oxygen.

* * * * *